United States Patent [19]

Ousborne

[11] Patent Number: 4,999,763
[45] Date of Patent: Mar. 12, 1991

[54] SELF SERVICE ACCESS CONTROLLER

[76] Inventor: Jeffrey J. Ousborne, 6708 Bushranger Path, Columbia, Md. 21046

[21] Appl. No.: 186,032

[22] Filed: Apr. 25, 1988

[51] Int. Cl.⁵ .......................... G05B 19/00; B60S 3/04
[52] U.S. Cl. .................... 364/140; 364/478; 134/57 R; 134/123; 15/DIG. 2
[58] Field of Search ............... 364/401, 410, 479, 140, 364/143, 478; 235/381; 134/57 R, 123; 15/DIG. 2

[56] References Cited

U.S. PATENT DOCUMENTS

| | | | |
|---|---|---|---|
| 4,085,313 | 4/1978 | Van Ness | 235/381 |
| 4,293,914 | 10/1981 | Van Trang | 364/478 |
| 4,369,442 | 1/1983 | Werth et al. | 364/479 |
| 4,412,292 | 10/1983 | Sedam et al. | 364/479 |
| 4,527,578 | 7/1985 | Klein et al. | 134/57 R |
| 4,567,359 | 1/1986 | Lockwood | 235/381 |
| 4,654,800 | 3/1987 | Hayashi et al. | 364/479 |
| 4,689,757 | 8/1987 | Downing et al. | 364/479 |
| 4,706,794 | 11/1987 | Awane et al. | 364/479 |
| 4,719,932 | 1/1988 | Burton | 134/57 R |
| 4,724,334 | 2/1988 | Melek | 307/38 |
| 4,736,294 | 4/1988 | Gill et al. | 364/408 |
| 4,766,548 | 8/1988 | Cedrone et al. | 364/479 |
| 4,893,229 | 1/1990 | Detrick | 364/140 |

FOREIGN PATENT DOCUMENTS 57-105076 10/1982 Japan .

Primary Examiner—Allen R. MacDonald
Attorney, Agent, or Firm—William F. Frank

[57] ABSTRACT

The present invention provides for an improved access, control and monitoring system for a facility with multiple apparatus that are activated by the customer. It provides a consolidated means to control the activation of each apparatus and interface with the customer. It provides a consolidated means to configuration operations on the facility and a consolidated means to record activities occurring at the facility. It provides for system reconfiguration and review of activity at the site or from a remote location and can automatically notify a remote site on the occurrence of a preset event.

10 Claims, 5 Drawing Sheets

SELF SERVICE ACCESS CONTROLLER

FIELD OF INVENTION

The present invention is in the general field of service provided by equipment which is operated by the user. More specifically, the invention relates to those self service installations at which the user currently obtains use of the equipment by depositing money for a specific service

BACKGROUND OF THE INVENTION

The present invention relates to self service equipment generally found in laundromats and self service car wash facilities. Typically, a customer receives access to the various apparatus such as a washer, dryer or car wash equipment in these facilities by depositing money into each particular apparatus. Once sufficient money is deposited, the customer receives a specific time cycle or machine cycle from, for example, the washer, dryer or car wash. Alternatively, he might purchase a product from a vending machine on the premise.

A typical self service car wash facility comprises a single equipment room and several car wash bays. Each bay will have a money acceptor, wash function selector, high pressure wand and a foaming brush. To wash his car the customer first parks his car in one of the wash bays. The customer then deposits the required amount of money to start the wash cycle. Once the wash cycle is started, the customer can select any of the wash functions provided such as degrease, presoak, soap, foaming brush, rinse or wax. Once a wash function has been selected, the customer receives that specific service. While a function such as soap is selected, hot-high pressure water with a soap additive is dispensed from the high pressure wand. Using the high pressure wand, the customer applies the soap to his car. The customer continues to receive the function he selected until he selects another service or his wash cycle time expires. Regardless of the wash function selected, the customer receives the same total wash cycle time. Therefore all wash functions have the same cost per unit time. At any time during the wash cycle the customer can deposit additional money to add time to his wash cycle.

A typical laundromat comprises washers, dryers and dispensing machines. When the customer enters a sufficient amount of money to turn the apparatus on, it starts a machine cycle. In the case of a dryer a machine cycle is a specific drying time, for a washing machine it is a washing cycle, for a dispensing machine it is the dispensing of a product. The amount of money required to activate the apparatus is preset at the money accumulator and the time given with a dryer is preset at the dryer timer.

At some self service facilities the apparatus are activated by tokens rather than money. In these instances the customer can purchase tokens from a dispensing machine or a facility operator. These tokens have a specific redemption value in the various apparatus in the facility. By depositing these tokens in a token acceptor at a particular apparatus, the customer receives a product or service. These tokens can activate the apparatus by mechanical or electronic means.

In addition to the accumulators and timers associated with each apparatus, there are typically mechanical or electronic counters on each apparatus in the facility to audit the total money and or tokens deposited or the total number of cycles activated on each apparatus. The mechanical or electronic counters are typically overlaid onto the existing equipment. Since these counters are not required to operate the system, they can be disconnected, thereby defeating their intended purpose.

These presently available activation and monitoring systems have several drawbacks. First, the amount of money or number of tokens required to activate each apparatus must be manually preset at each accumulator individually. Second, in the case of a time cycle apparatus, the amount of time given for each activation must be manually preset at each timer individually. These timers do not allow price differentiation for the various services provided at a self service car wash bay. Third, the audit counts used to verify that the operators are accurately collecting all of the money must be manually tabulated. These audit counts can also be defeated without disabling the car wash service. Fourth, the owner/operator must manually tabulate statistical information on the use of various apparatus at the facility. Fifth, the operator must visit the facility to determine if operator service is required to repair broken equipment, refill chemicals, and remove or refill money and or tokens. Sixth, the money and or tokens are housed in each machine and they must be protected from theft or vandalism at each apparatus with a money vault or other protection device. The presence of the money at each site significantly increase the degree of vandalism and damage to these devices. Seventh, the facilities operator must collect the money and or tokens from each machine individual. In the case of the self service car wash bay, the collection of the money from each wash bay can present a significant personal exposure.

SUMMARY OF THE INVENTION

The present invention provides for an improved access, control and monitoring system for a facility with multiple apparatus that are activated by the customer (self service). It provides a consolidated means to control the activation of each apparatus and interface with the customer, means to preset the amount of money or number of tokens to activate an apparatus, means to preset the amount of time given in a time cycle apparatus, means to change pricing and cycle times by time of day and or day of week, means to collect and record apparatus information (such as money deposited, time used of each function of an apparatus, usage of apparatus by time of day and sensor values used to measure items such as liquid levels of chemicals used on the facility, water pressure and temperature), means to store and process apparatus information and statistics, means to access this information and change system configuration from the centralized site or from a remote location away from the facilities, means for the system to automatically notify a remote site in the event that one or more of the aforementioned sensor values goes outside of the operator specified range, means to centralize the money collection to a limited number of sites by opening a customer account and providing to the customer an account authorization voucher in a printed, electronic or magnetic media and means for the customer to access specific apparatus on the facility with an account authorization device.

DETAILED DESCRIPTION OF THE INVENTION

Figure 1:
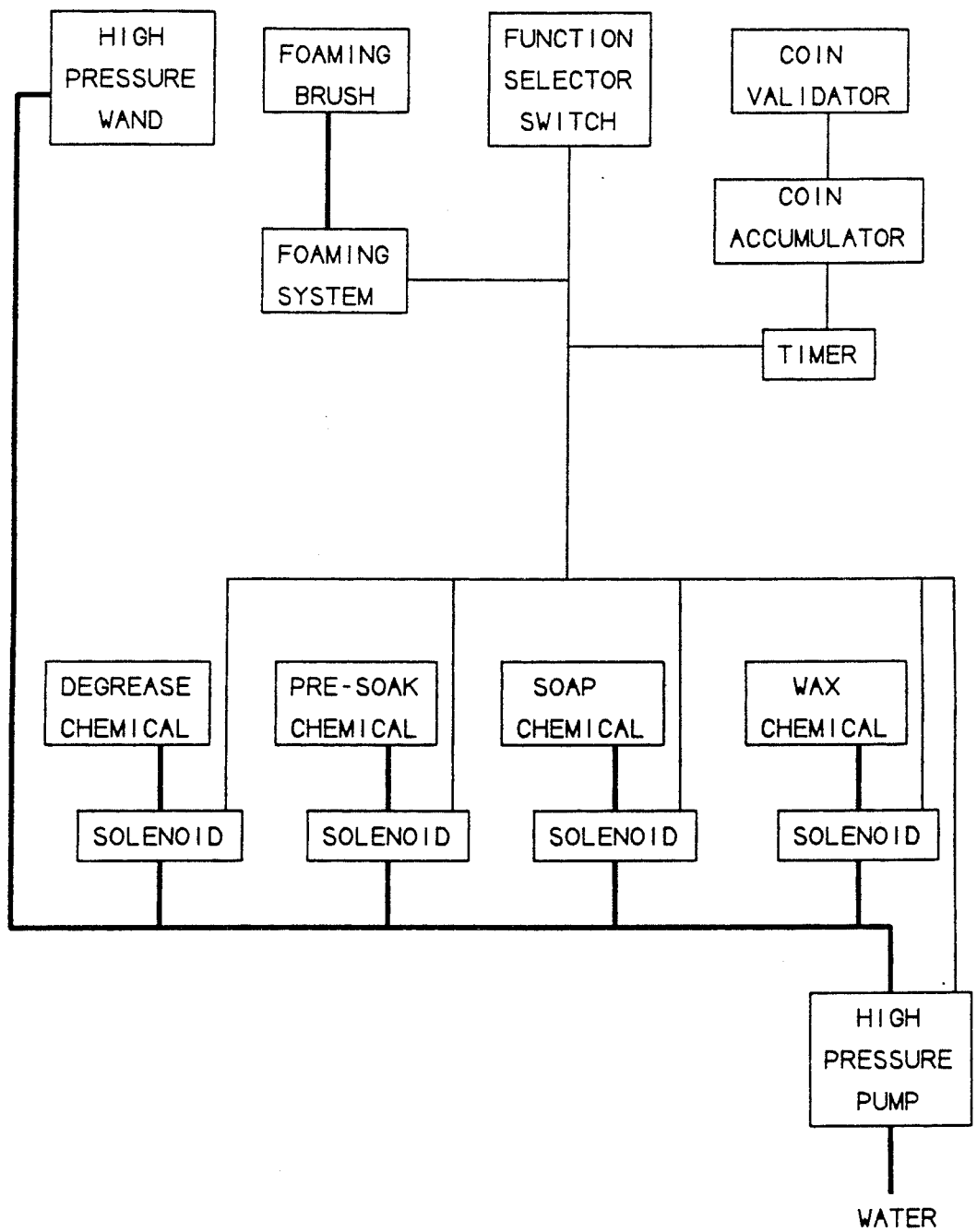
FIG. 1 is a schematic representation of a self service car wash facility.

A typical self service car wash facility is shown in FIG. 1. The customer interface includes 1) a money acceptor, 2) a mechanical or electronic function selector to select wash chemicals such as degrease, presoak, soap, wax, rinse or to select an alternate washing tool such as a foaming brush, and 3) the washing tools such as a high pressure wand and a foaming brush. When the customer enters the car wash bay he must first deposit a sufficient amount of money to turn the washing equipment on. The amount of money required to activate the machine is preset at a mechanical or electronic money accumulator which counts the amount of money deposited. When sufficient money is deposited, the accumulator activates a mechanical or electronic timer that turns the equipment on for a preset period of time (as preset at the timer). At this point the high pressure hot water is activated and is controlled by the customer using the high pressure wand. While this timer is on, the customer can select and receives specific car wash services such as soap or wax by selecting that function with the function selector The function selector turns on and off solenoids that add different chemicals to the high pressure wash. When the preset time expires, the system is turned off. If additional money is deposited before that particular wash cycle expires, additional time is provided.

Figure 2:
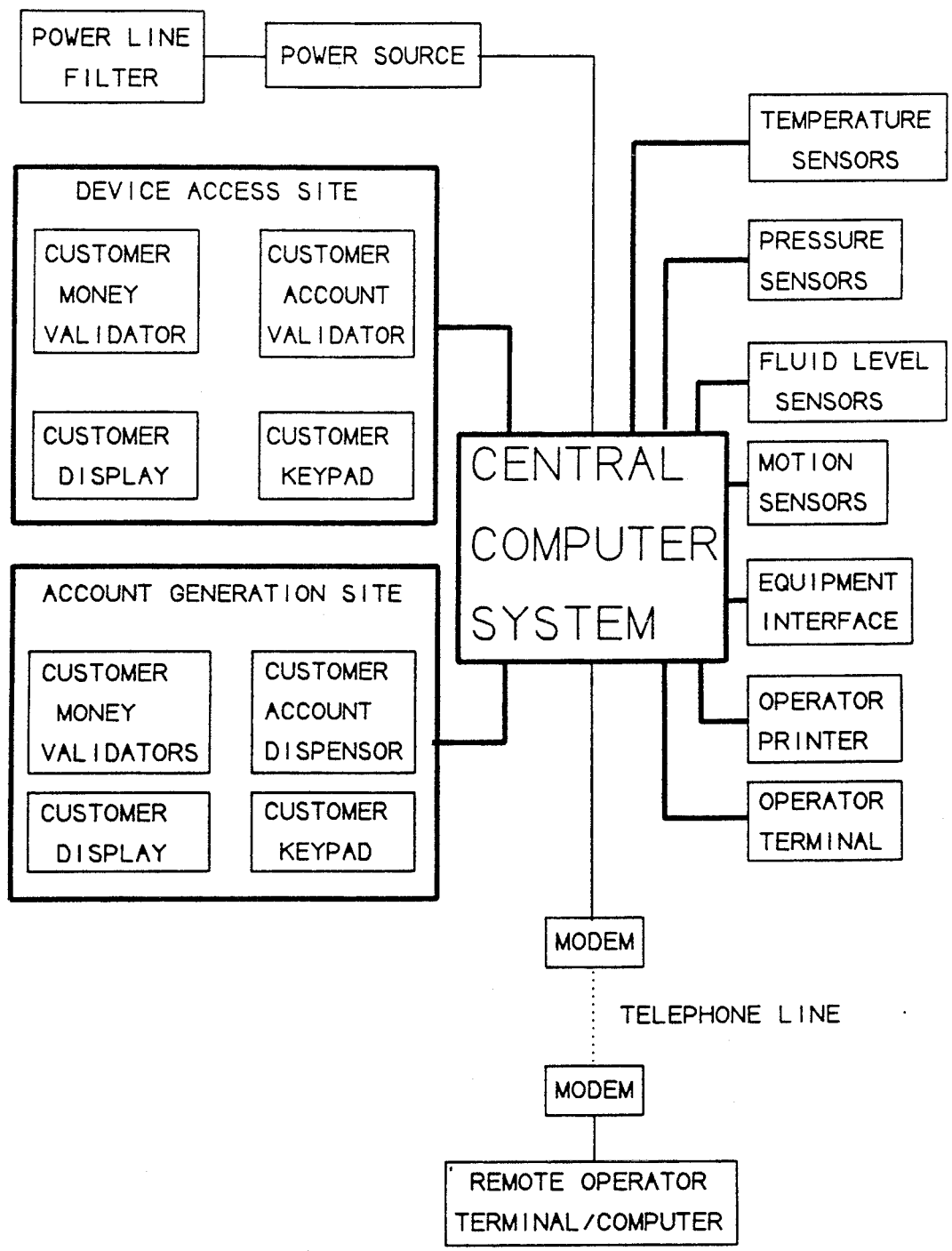
FIG. 2 is a schematic representation of the overall access control system incorporating the present invention.

Referring to FIG. 2, a preferred embodiment of the present invention is shown as a self service access controller. As shown, the access controller consists of a power source and power line filtering, a computer/microprocessor, customer access and information displays, money and or token sensing electronics, apparatus activation and control hardware, remote and local owner/operator terminals and keypads, and customer account generation sites.

Figure 3:
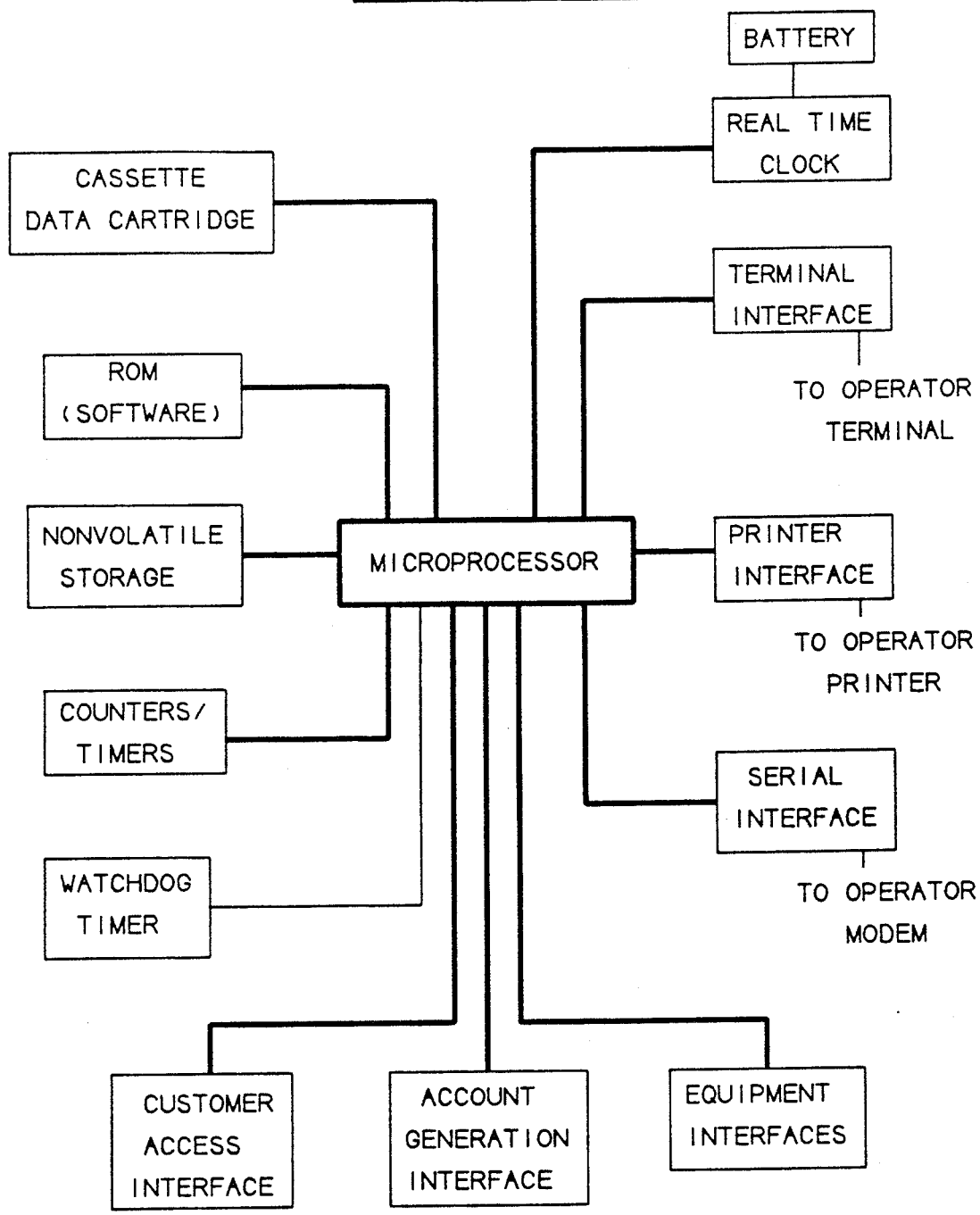
FIG. 3 is a schematic representation of the centralized computer control system

The computer is shown in FIG. 3 and is typically a STD bus CMOS microprocessor board that includes a real time clock having a lithium battery backup capability to maintain time during normal power loss or power failures, "watchdog" timer, serial ports and a parallel port. This board is typically inserted into a STD bus card rack. CMOS EPROMS such as 27C512's containing the access control program are inserted in the microprocessor board along with nonvolatile RAM. The nonvolatile RAM is used to store apparatus accounting information and customer account information. Nonvolatile RAMs are memory systems that preserve the information in their memory during power loss. Generally, low power CMOS RAMs with battery backup capability are used as nonvolatile RAM.

The real time clock is used during the automatic collection of time of day and day of week statistics and to automatically change any specials, pricing or facility operations that vary with time of day or day of week as specified by the operator. The "watchdog" timer is used to automatically reset the microprocessor system if the microprocessor stops performing correctly. This provides for unattended capability.

In addition to and as a alternative to the nonvolatile RAM, EEPROMs are used to store system configuration information. Bubble memory is used to store and backup critical data such as the account information when accounts will be valid for extended periods of time. Digital cassette data cartridges or disks are used to record all transactions in the event of a need to reconstruct all transactions at the facility. The Bubble memory, data cartridges and EEPROMs are not required in general and any can be used as an alternative or supplement to the nonvolatile RAM.

The owner/operator sets all apparatus configurations, comprising cost to activate an apparatus and which apparatus functions are available, and receives all apparatus information and statistics using a computer terminal interfaced to the computer via a serial port. At the facility, a printer is interfaced to the computer via a parallel interface to print system configuration and audit information and statistics.

The computer terminal at the facility is used for three basic modes of operation: 1) to continuously monitor all activities and sensors on the site (default mode), 2) to change system and apparatus configurations (setup mode), and 3) to review and print audit counts and statistics (audit mode). The default mode of the system terminal is a continuously monitoring mode where all customer activities comprising money, token or account entries are displayed along with apparatus status such as time left in a time cycle apparatus and sensor values such as water temperature/pressure and chemical levels are displayed. Additionally, warning notices are displayed during the default mode for sensor values that are outside operator defined ranges. The setup mode allows the operator to change specific operating parameters of the total system and individual apparatus. System parameters comprise items such as setting system passwords, setting normal operating ranges for all system sensors and the telephone number(s) to call when specific sensor parameters exceed the normal operating range and setting a combination time of day and day of week general rate changes if any. Individual apparatus parameters comprise the amount of money or tokens required to activate an apparatus, time given for a single activation in a time cycle apparatus, time given for addition money or tokens deposited and availability of specific functions of that apparatus. The audit mode allows the operator to centrally determine the time usage of each specific function of an apparatus, total amount of money collected at money collection sites, time of day and day of week summaries on the use of a single apparatus, class of apparatus or all apparatus on the facility.

A second serial interface is used for communication via a modem and telephone line to a remote computer terminal or PC. When the remote site is activated by calling the facility computer and signing on with the correct password, that remote site can perform all of the functions that the terminal on the facility is capable of. In addition, this site can be automatically called and notified whenever sensor values are outside the operator defined normal operating ranges.

When customer accounts are employed, several types of devices can be used to generate customer accounts at the account generation site shown in FIG. 2. These accounts are generated at a limited number of sites. These sites include money acceptors, a customer display and keypad and account voucher dispenser. Money acceptor are used to accept customer currency. Customer information and instructions are displayed on a customer display. When customer selections are required the customer uses a customer keypad, typically a custom made membrane keypad. Several types of account vouchers are employed depending on the specific application. These can include printed, magnetic "credit card" type or electronic vouchers. The account printer, magnetic card encoders or electronic media are interfaced to the computer via a serial or parallel port. These accounts can have special discount pricing associated with them.

At each apparatus such as a car wash bay, laundromat washing machine or dryer, there is a customer access interface as shown in the device access site in FIG. 2. This interface can be as simple as a keypad or money and or token acceptor to a combination of a display, keypad, money and or token acceptors and account authorization devices. In the simplest case only a money and or token acceptor is interfaced to the computer controller. In this situation, when sufficient money is inserted as determined by the computer controller, the computer controller activates the apparatus and in the case of a time cycle apparatus the computer controls the duration of this cycle.

Illustratively, a complete device access site as shown in FIG. 2 would comprise a money and or token acceptor, a custom membrane keypad to enter numeric account vouchers and select functions such as a specific car wash service, a magnetic "credit card" type reader to read magnetic encoded account vouchers, and a customer display that provides the customer with instructions and information.

Figure 4:
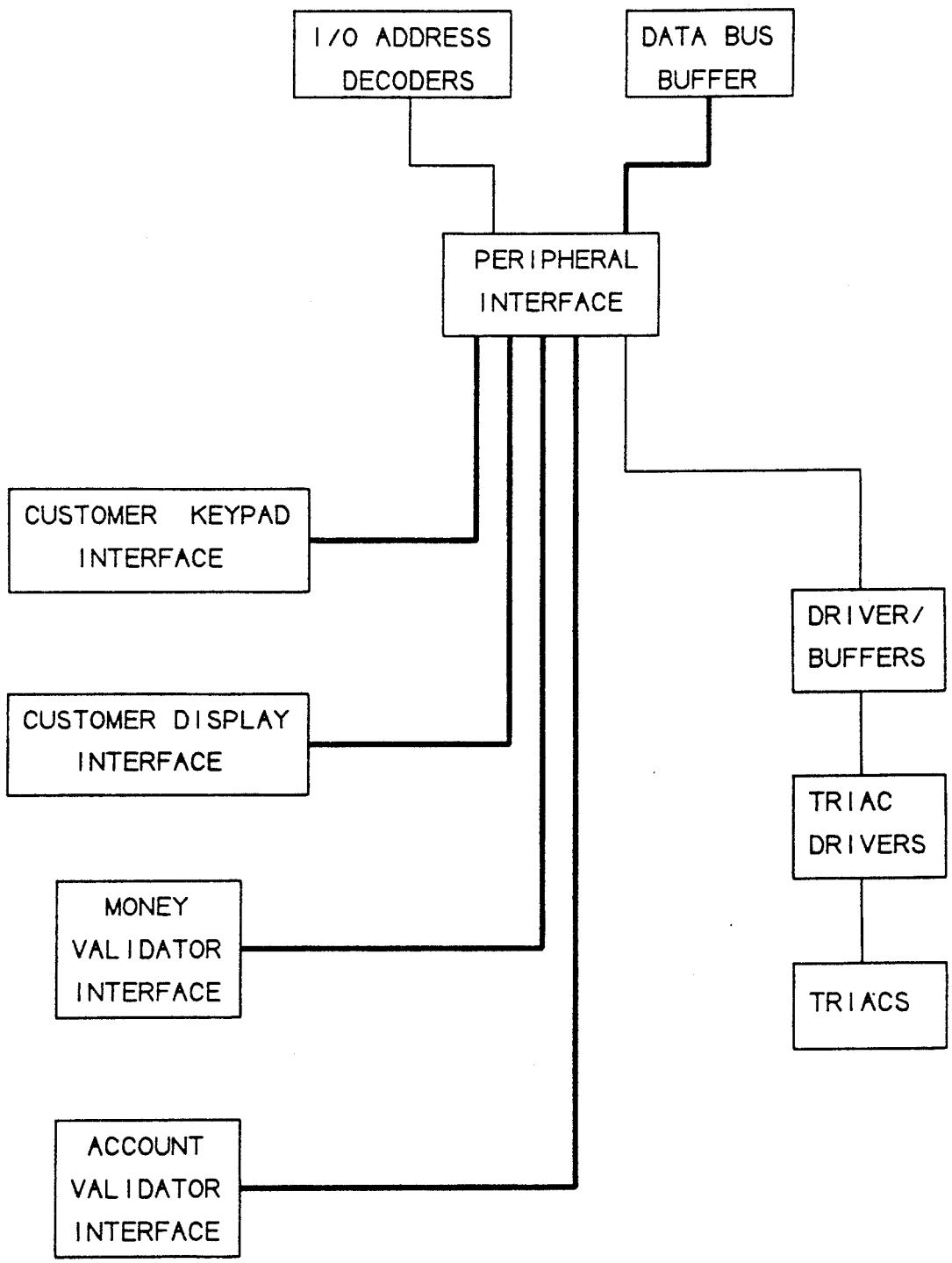
FIG. 4 is a schematic representation of the apparatus interface system.

As shown in FIG. 4 the computer is interfaced to I/O boards housed in the STD bus that sense money and or tokens being deposited and activate the various apparatus. These boards typically contain I/O address decoding, I/O devices such as an 82C55, optically isolated triac drivers and triacs to control the remote devices, optically isolated money and or token sensing units consisting of a diode bridge, filter, and optically isolated driver such as a 4N25. These boards also include the customer account entry device interface. Depending on the application, this can include I/O lines and drivers/buffers to decode entries on a matrix encoded keypad. It can also include a serial or parallel interface to a magnetic card reader or an electronic key device and a serial or parallel interface to a customer display. These boards typically include EEPROMs that are used for nonvolatile storage of apparatus configuration parameters.

Figure 5:
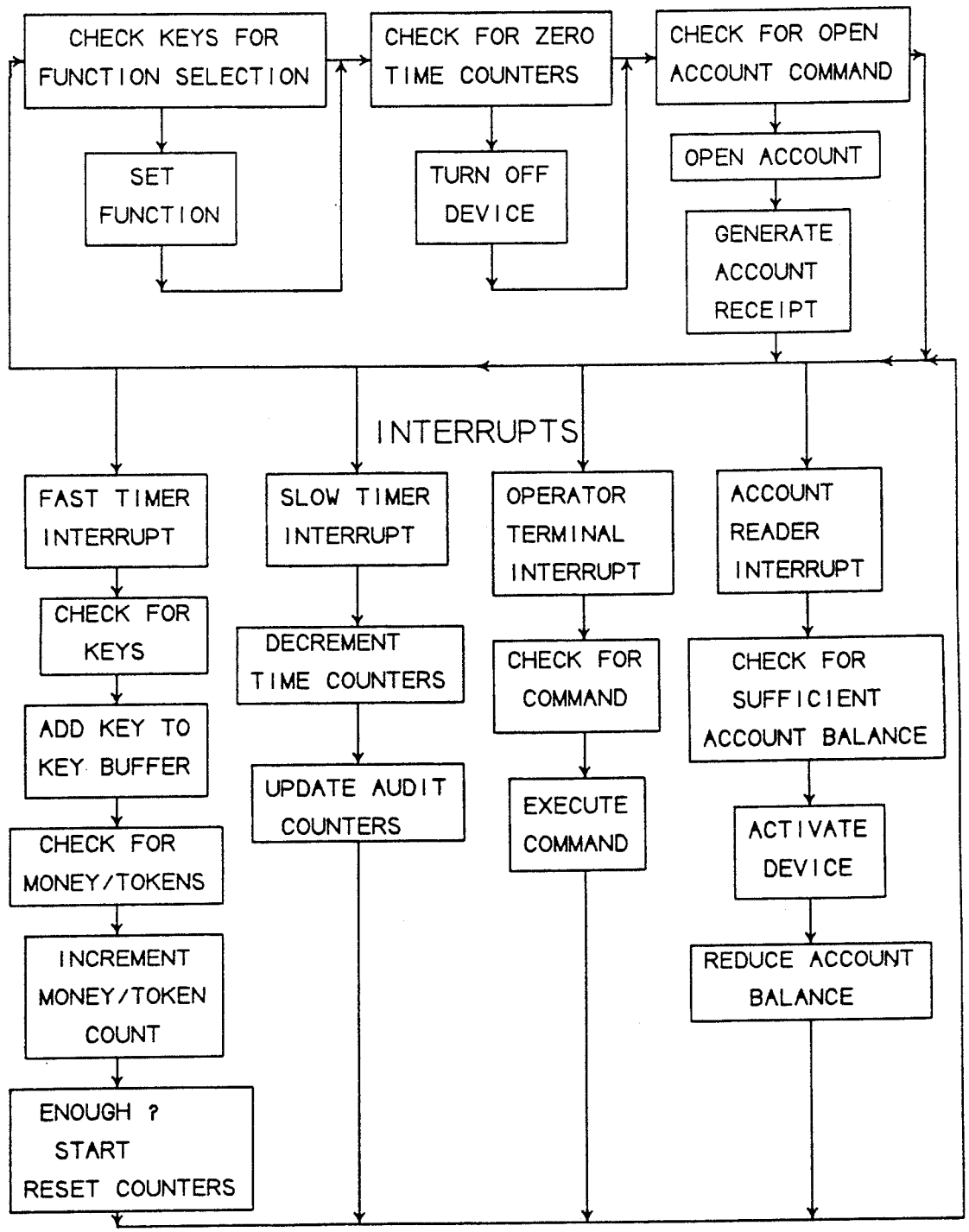
FIG. 5 is a flow chart of the computer program

The computer system is controlled by a software program and its general flow is shown in FIG. 5. This program is interrupt driven by interrupts from serial and parallel interfaces and timers. Although only one timer interrupt is required, two timer rates are typically used, one high speed rate of order 1000 Hz for keypad scanning and a low speed rate of order 1 Hz for apparatus timing.

At each of the high speed interrupts the keypads, money and token acceptors are scanned. If a key is detected, it is decoded and stored in a keypad buffer. If money or a token is detected, the program increments the current and total money and token counts. If the key is an apparatus function selection, the particular apparatus function is changed. If the key is an alphanumeric or numeric account code entry, it is stored, and when the entire code is entered, it is checked against valid account codes. If the account has sufficient credit or the current money or token count reaches the operator preset number, the apparatus is activated. If it is a time cycle apparatus, the operator specified cycle time is loaded into that apparatus time counter At that point the keypad buffer or money or token counts are cleared. If money or tokens are entered while the wash is activated, an operator preset amount of time is added to the wash cycle time counter. If an invalid account is entered, a false code entry signal (long buzzer) is activated. When an operator specified number of sequential false codes is entered, the remote site terminal is notified.

At each low speed interrupt the program decrements all nonzero time counters When any apparatus timer reaches an operator specified time, a "time running out" buzzer is activated at that apparatus. If a display is present, a message is displayed to the customer at that apparatus. When any apparatus timer reaches zero, that particular apparatus is turned off by the computer At each 1 second interrupt, the program increments the time usage counter for each particular function of an apparatus as well as the total time usage counter.

Whenever a serial or parallel interface interrupt occurs from an account authorization device, the account is verified to determine if sufficient funds are available to activate the apparatus. If so, the apparatus is activated, and the account balance is reduced by the cost of that apparatus.

Each time an apparatus is activated by an account, the account information is updated, and the available account credit is reduced by the appropriate amount. If the apparatus is activated by money or tokens, the program increments the money or token count for that apparatus. Additionally, the program increments the particular apparatus activation count for either type of activation.

When a serial interrupt occurs for either the on site terminal or remote terminal, a check is made to determine what data or command has been issued If a command is requested, the program presents the command options on the terminal and accepts appropriate responses. Prior to allowing access from the remote site, the remote site must first be authenticated. Two operator selected options are available. First, a password protection can be used or secondly, a call back scheme can be employed. In the call back scheme, the remote site calls the computer and enters a password at which point the computer hangs up and dials an operator preset telephone number and allows access to the computer with password protection.

The present invention has been illustratively shown and described in a preferred embodiment. Such modifications in computer control as may occur to those in the art are considered to be within the scope of the following claims.

What is claimed

1. A computer controlled system providing customer access to, control and monitoring of self service equipment providing respective car wash functions within a car wash facility which includes at least one car wash bay, the system comprising:
  a computer;
  means coupled to said computer for allowing a customer to select and to change specific ones of the car wash functions thereby defining a car wash cycle;

means to implement access, control and monitoring functions in the computer;

a plurality of respective apparatuses for respectively providing the respective carwash functions; and means coupled to the computer and responsive to signals therefrom for enabling specific ones of said apparatuses for providing selected ones of the car wash functions in accordance with the defined car wash cycle.

2. The computer controlled system of claim 1 further comprising means coupled to the computer to preset at least the cost to activate each of the apparatuses.

3. The computer controlled system of claim 1 wherein the computer further comprises means to control at least amount of time given for each activation of a time cycle for at least one of the apparatuses and means coupled to the computer to preset the amount of time.

4. The computer controlled system of claim 1 further comprising means coupled to the computer to preset an automatic change of cost per unit time of each of the apparatuses as a function of at least of time of day and day of week.

5. The computer controlled system of claim 1 further comprising means coupled to the computer to open a customer account, means coupled to the computer to generate a customer voucher, and means coupled to the computer to authenticate accounts in the facility wherein the account is used to access various ones of the apparatuses.

6. The computer controlled system of claim 1 further comprising means coupled to the computer to store and review usage statistics and cash deposited information.

7. The computer controlled system of claim 1 further comprising means coupled to the computer to monitor at least one liquid level in at least one of the apparatuses.

8. The computer controlled system of claim 1 further comprising means coupled to the computer for monitoring at least one parameter at the car wash facility and means coupled to the computer to automatically notify at least one remote site when the monitored parameter is outside of operator preset range.

9. The computer controlled system of claim 1 further comprising means coupled to the computer to sense a computer malfunction and restore normal operations.

10. A computer controlled system providing customer access to, control and monitoring of self service equipment providing respective car wash functions within a car wash facility which includes at least one car wash bay, the system comprising:

a computer;

means coupled to said computer for allowing a customer to select and to change specific ones of the car wash functions thereby defining a car wash cycle;

means to implement access, control and monitoring functions in the computer;

means to store and retrieve data in nonvolatile storage coupled to the computer;

a plurality of respective apparatuses for respectively providing the respective car wash functions;

means coupled to the computer and responsive to signals therefrom for enabling specific ones of said apparatuses for providing respective ones of the car wash functions in accordance with the defined car wash cycle; and means coupled to the computer to preset a cost per unit time independently for each individual wash function to the respective apparatuses.

* * * * *